United States Patent
Shin et al.

(10) Patent No.: US 10,156,017 B2
(45) Date of Patent: Dec. 18, 2018

(54) METHOD FOR SIMULTANEOUSLY RECOVERING COBALT AND MANGANESE FROM LITHIUM BASED BATTERY

(71) Applicant: KOREA INSTITUTE OF GEOSCIENCE AND MINERAL RESOURCES (KIGAM), Daejeon (KR)

(72) Inventors: Shun-Myung Shin, Daejeon (KR); Sung-Ho Ju, Jinju-si (KR); Dong-Ju Shin, Daejeon (KR); Jei-Pil Wang, Busan (KR)

(73) Assignee: KOREA INSTITUTE OF GEOSCIENCE AND MINERAL RESOURCE (KIGAM), Daejeon (KR)

( * ) Notice: Subject to any disclaimer, the term of this patent is extended or adjusted under 35 U.S.C. 154(b) by 150 days.

(21) Appl. No.: 15/121,212

(22) PCT Filed: Jan. 23, 2015

(86) PCT No.: PCT/KR2015/000757
§ 371 (c)(1),
(2) Date: Aug. 24, 2016

(87) PCT Pub. No.: WO2016/114439
PCT Pub. Date: Jul. 21, 2016

(65) Prior Publication Data
US 2017/0009358 A1    Jan. 12, 2017

(30) Foreign Application Priority Data
Jan. 13, 2015 (KR) .................. 10-2015-0006457

(51) Int. Cl.
| | |
|---|---|
| C25C 7/02 | (2006.01) |
| C25C 1/08 | (2006.01) |
| C25C 1/10 | (2006.01) |
| C22B 1/14 | (2006.01) |
| C22B 3/04 | (2006.01) |
| C22B 3/00 | (2006.01) |
| C22B 23/00 | (2006.01) |
| C22B 47/00 | (2006.01) |
| H01M 10/54 | (2006.01) |
| H01M 6/52 | (2006.01) |
| C25C 3/02 | (2006.01) |
| C22B 1/02 | (2006.01) |
| C22B 1/248 | (2006.01) |
| C22B 7/00 | (2006.01) |
| C22C 11/06 | (2006.01) |
| C25C 7/00 | (2006.01) |

(52) U.S. Cl.
CPC ............ *C25C 7/02* (2013.01); *C22B 1/02* (2013.01); *C22B 1/248* (2013.01); *C22B 7/007* (2013.01); *C22B 23/043* (2013.01); *C22B 23/0461* (2013.01); *C22B 47/00* (2013.01); *C22B 47/0009* (2013.01); *C22C 11/06* (2013.01); *C25C 1/08* (2013.01); *C25C 1/10* (2013.01); *C25C 3/02* (2013.01); *C25C 7/007* (2013.01); *H01M 6/52* (2013.01); *H01M 10/54* (2013.01); *Y02P 10/234* (2015.11); *Y02W 30/84* (2015.05)

(58) Field of Classification Search
None
See application file for complete search history.

(56) References Cited

U.S. PATENT DOCUMENTS 6,086,691 A * 7/2000 Lehockey .............. C25C 7/02
148/706

FOREIGN PATENT DOCUMENTS

| | | |
|---|---|---|
| CN | 101270415 A | 9/2008 |
| CN | 102665912 A | 9/2012 |
| CN | 102694163 A | 9/2012 |
| CN | 102828206 A | 12/2012 |
| CN | 103168107 A | 6/2013 |
| CN | 104037468 A | 9/2014 |
| CN | 104264184 A | 1/2015 |
| EP | 0409792 A1 | 1/1991 |
| EP | 2450991 A1 * | 5/2012 ............ H01M 6/52 |
| JP | 04-099293 A | 3/1992 |
| JP | 2000-036304 A | 2/2000 |
| JP | 2005-149889 A | 6/2005 |
| JP | 2008-007801 A | 1/2008 |
| JP | 2012-092447 A | 5/2012 |
| JP | 2012-204343 A | 10/2012 |

(Continued)

OTHER PUBLICATIONS

Wankat, Philip, "Equilibrium Staged Separations", Section 18.11 Leaching, Prentice Hall, 1988, pp. 619-623 (Year: 1988).*

(Continued)

*Primary Examiner* — Harry D Wilkins, III
(74) *Attorney, Agent, or Firm* — Novick, Kim & Lee, PLLC; Jae Youn Kim

(57) ABSTRACT

The present invention relates to a method of simultaneously recovering cobalt (Co) and manganese (Mn) from lithium-based BATTERY, and more particularly, to a method that is capable of simultaneously recovering cobalt and manganese from lithium-based BATTERY, i.e., recycled resources that contain large amounts of cobalt and manganese, with high purities using multistage leaching and electrowinning methods. According to the method of the present invention, cobalt and manganese can be simultaneously recovered from lithium-based BATTERY as recycled resources, and a recovery method that is cost-effective compared to conventional methods can be provided.

4 Claims, No Drawings

(56) References Cited

FOREIGN PATENT DOCUMENTS

| JP | 2013-199692 A | 10/2013 |
|----|---------------|---------|
| JP | 2013-538936 A | 10/2013 |
| KR | 10-2003-0073820 A | 9/2003 |
| KR | 10-2011-0062307 A | 6/2011 |

OTHER PUBLICATIONS

Kumar et al, Prospects for solvent extraction processes in the Indian context for the recovery of base metals. A review, Hydrometallurgy, vol. 103, No. 1-4, Jun. 2010, pp. 45-53 (Year: 2010).*

Devi et al, Separation of divalent manganese and cobalt ions from sulphate solutions using sodium salts of D2EHPA, PC 88A and Cyanex 272, Hydrometallurgy, vol. 54, No. 2-3, Jan. 2000, pp. 117-131 (Year: 2000).*

Tripathy et al, Effect of manganese(II) and boric acid on the electrowinning of cobalt from acidic sulfate solutions, Metallurgical and Materials Transactions B, vol. 32, No. 3, Jun. 2001, pp. 395-399 (Year: 2001).*

Mulaudzi et al, Direct cobalt electrowinning as an alternative to intermediate cobalt mixed hydroxide product, The Southern African Institute of Mining and Metallurgy, Seventh Southern African Base Metals Conference, Sep. 2-6, 2013, White River, Mpumalanga, South Africa (Year: 2013).*

\* cited by examiner

METHOD FOR SIMULTANEOUSLY RECOVERING COBALT AND MANGANESE FROM LITHIUM BASED BATTERY

TECHNICAL FIELD

The present invention relates to a method of simultaneously recovering cobalt (Co) and manganese (Mn) from lithium-based BATTERY, and more particularly to a method that is capable of simultaneously recovering cobalt and manganese from lithium-based BATTERY, i.e., recycled resources that contain large amounts of cobalt and manganese, with high purities using multistage leaching and electrowinning methods.

BACKGROUND ART

Co and Mn have very similar physicochemical behaviors, and thus it is very difficult to separate and recover Co and Mn. Methods of separating Co and Mn include precipitation methods in which only Mn is selectively precipitated using an oxidizing agent or Co is selectively precipitated using $Na_2S$, and solvent extraction methods in which Mn is recovered using di-(2-ethylhexyl) phosphoric acid (DEHPA) or Co is recovered using Cyanex 301.

However, all the above-described recovery methods have problems in that the use of an expensive oxidant is required to separately recover Co and Mn and in that the use of Cyanex 301 that is a very expensive solvent is required.

Therefore, the present invention is intended to overcome the above-described problems resulting from the use of expensive oxidants and extractants in the processes for separating and purifying Co and Mn from recycled resources containing Co and Mn, and is also intended to produce high-purity products by simultaneously recovering Co as Co metal and Mn as electrolytic manganese dioxide (EMD).

DISCLOSURE

Technical Problem

The present invention has been contrived to overcome the above-described problems of the conventional art, and an object of the present invention is to provide a method that is capable of simultaneously recovering cobalt and manganese, which are contained in lithium-based BATTERY, i.e., recycled resources, in large quantities, with high yields in a cost-effective manner.

Technical Solution

To order to overcome the above technical problem, the present invention provides a method of simultaneously recovering cobalt and manganese from lithium-based BATTERY, the method including:

(1) heat-treating the lithium-based BATTERY;

(2) grinding the heat-treated BATTERY to obtain ground particles, and separating particles having a particle size of 12 mesh or less from the ground particles;

(3) subjecting the separated particles to multistage leaching;

(4) adding 2-ethylhexyl phosphonic acid mono-2-ethylhexyl ester (PC88A) to a product of the multistage leaching to obtain an electrowinning solution;

(5) subjecting the electrowinning solution to electrowinning using circulation-type electrodes, the electrodes including a cathode made of stainless steel and an anode made of a 93% Pb-7% Sn alloy; and (6) washing.

The lithium-based BATTERY is preferably a mixture of lithium-ion BATTERY and lithium primary BATTERY.

The electrowinning is preferably performed in an electrolytic cell at a pH of 2 or more.

The electrowinning is preferably performed in an electrolytic cell at a current density of 0.025-0.065 $A/cm^2$.

The electrowinning is preferably performed in an electrolytic cell at a temperature of 30-60° C.

The concentration of cobalt ions in the electrowinning is preferably 15-20 g/L or higher.

The washing is preferably performed using sulfuric acid.

Advantageous Effects

According to the method of the present invention, cobalt and manganese can be simultaneously recovered from lithium-based BATTERY, i.e., recycled resources, and a recovery method that is cost-effective compared to conventional methods can be provided.

MODE FOR INVENTION

Hereinafter, the present invention will be described in detail.

The present inventors have conducted extensive studies to solve the problems of the conventional methods of recovering cobalt and manganese from lithium-based BATTERY using expensive oxidizing agents and, as a result, have developed a method that is capable of simultaneously recovering cobalt and manganese with high efficiency by multistage leaching and electrowinning at a specific pH, temperature and current density, thereby completing the present invention.

Accordingly, the present invention provides a method of simultaneously recovering cobalt and manganese from lithium-based BATTERY, the method including:

(1) heat-treating the lithium-based BATTERY;

(2) grinding the heat-treated BATTERY to obtain ground particles, and separating particles having a particle size of 12 mesh or less from the ground particles;

(3) subjecting the separated particles to multistage leaching;

(4) adding 2-ethylhexyl phosphonic acid mono-2-ethylhexyl ester (PC88A) to a product of the multistage leaching to obtain an electrowinning solution;

(5) subjecting the electrowinning solution to electrowinning using circulation-type electrodes, the electrodes including a cathode made of stainless steel and an anode being made of a 93% Pb-7% Sn alloy; and (6) washing.

It is preferred that the lithium-based BATTERY be lithium-ion BATTERY or a mixture of lithium-ion BATTERY and lithium primary BATTERY.

In a preferred embodiment, the lithium-based BATTERY may be a mixture of lithium-ion BATTERY and lithium primary BATTERY mixed at a mass ratio of 4:1.

In a preferred embodiment, the heat treatment of the lithium-based BATTERY may be performed in a heat-treatment furnace at 500° C., after lithium-ion BATTERY and lithium primary BATTERY are mixed at a ratio of 4:1 and inert gas is injected into the heat-treatment furnace at a rate of 1 L/min.

In a preferred embodiment, the multistage leaching may be performed by referring to the conventional art, for example, a method of producing cobalt-manganese-bromine (CMB) from a ternary cathode active material, or a method of producing CMB from waste CMB catalysts. More specifically, in first-stage leaching, powder having a particle size of 12 mesh or less may be subjected to sulfuric acid reductive leaching using 5-10% hydrogen peroxide at a solid-to-liquid ratio of 1:1, a sulfuric acid concentration of 0.5-2 M, a temperature of 50-80° C., and a stirring speed of 150-400 rpm. After the first-stage leaching, using a filtrate obtained by solid-liquid separation as a leaching agent, the powder having a particle size of 12 mesh or less may be subjected to second-stage leaching using 5-10% hydrogen peroxide at a temperature of 50-80° C. and a stirring speed of 150-400 rpm.

The electrowinning is preferably performed in an electrolytic cell at a pH of 2 or more. If the pH is less than 2, problems occur in that the yield of cobalt is low and it is difficult to maintain a current efficiency of 90% or more. The electrowinning is preferably performed at a current density of 0.025-0.065 A/cm², most preferably 0.05 A/cm². The reason for this is that at this current density, the yield is high and the cobalt sheet can be very smooth.

In the electrowinning process, the temperature of the electrolytic cell is preferably 30 to 60° C., and most preferably 50 to 60° C. in terms of the yield and the current efficiency.

If the electrowinning process is performed in a single electrolytic cell, the concentration of Co ions in the electrolytic cell during the electrowinning process will be reduced, and thus a problem arises in that the current efficiency for production of Co metal decreases with an increase in the current density. In addition, hydrogen ions will be generated in the cathode to cause a reaction that competes with the reaction for production of Co metal, thus reducing the current efficiency for production of Co metal. Accordingly, to solve such problems, a circulation-type electrolytic cell is used in the present invention. A solution feed tank functions to prevent the concentration of Co ions from decreasing, and a pH adjustment tank functions to increase the pH of the reduced solution from the electrolyte by adding a $Na_2CO_3$ solution thereto. The reactions in the cathode and anode of the electrolytic cell of the present invention are as follows:

Reaction in Cathode:

$$Co^{2+} + 2e^- \rightarrow Co \tag{1}$$

$$2H^+ + 2e^- \rightarrow H_2 \uparrow \tag{2}$$

Reaction in Anode:

$$Mn^{2+} + 2H_2O \rightarrow MnO_2 + 4H^+ + 2e^- \tag{3}$$

The washing is preferably performed using sulfuric acid. In a preferred embodiment, the washing using sulfuric acid includes washing the obtained electrolytic manganese dioxide (EMD) using sulfuric acid at a certain concentration, for example, a concentration of 1M, 2M or 3M. More specifically, the washing may be performed at a solid-to-liquid ratio of 1:10, at room temperature and at a stirring speed of 150-250 rpm.

Hereinafter, the present invention will be described in more detail via examples.

EXAMPLES

1: Simultaneous Recovery of Co Metal and Electrolytic Manganese Dioxide (EMD)

1-1: Preparation of Electrowinning Solution

Lithium-based BATTERY obtained by mixing lithium primary BATTERY and lithium-ion BATTERY at a mass ratio of 1:4 were heat-treated. The heat-treated BATTERY were crushed and ground with Shredder and pin mills, and separated into powder having a particle size under 12 mesh and powder having a particle size over 12 mesh. The separated battery powder having a particle size under 12 mesh was subjected to multistage leaching. With respect to the solution resulting from the multistage leaching, Co and Mn were separated and concentrated from Ni using PC88A.

A coconut tree-derived activated carbon for liquids was used to remove organic materials from the solution shown in Table 3 below, thereby obtaining a solution for electrowinning. The composition of the solution is shown in Table 3 below.

TABLE 1

Contents of valuable metals in lithium-based battery particles separated into under and over 12 mesh (wt %)

| | Co | Mn | Ni | Li | Cu | Fe | Al |
|---|---|---|---|---|---|---|---|
| Under 12 mesh | 16.24 | 0.28 | 2.38 | 3.18 | 4.83 | 2.70 | 9.07 |
| Over 12 mesh | 0.54 | 0.16 | 0.58 | 0.009 | 0.59 | 4.25 | 24.91 |

TABLE 2

Results of multistage leaching of powder having particle size under 12 mesh (mg/L)

| | Co | Mn | Ni | Li | Cu | Fe | Al |
|---|---|---|---|---|---|---|---|
| First-stage leaching | 18700 | 270 | 880 | 5340 | 5310 | 3100 | 7840 |
| Second-stage leaching | 23010 | 690 | 1300 | 6200 | 200 | — | — |

TABLE 3

Composition of electrowinning solution (recovery and concentration of Co and Mn by solvent extraction and removal of organic materials by activated carbon)

|  | Co | Mn | Ni | Li | Cu | Fe | Pb | Cd | Zn | Ca | Mg | Al | pH |
|---|---|---|---|---|---|---|---|---|---|---|---|---|---|
| Stripped solution | 72 g/L | 1.7 g/L | 12 | 1.3 | 175 | 0 | 0 | 0 | 0 | 0 | 0 | 6.7 | 2.47 |
| Stripped solution after removal with activated carbon | 72 g/L | 1.7 g/L | 12 | 1.3 | 0 | 0 | 0 | 0 | 0 | 0 | 0 | 0 | 2.47 |

1-2: Electrowinning

As the electrodes used in an electrowinning experiment, the cathode was made of stainless steel (SS), and the anode was made of a 93% Pb-7% Sn alloy. An electrolytic cell having one cathode and one anode was used, and a heater was also provided in order to prevent the temperatures of the electrolytic cell and a solution feed tank from being lowered. In addition, a pH meter was disposed in each of the electrolytic cell, the solution feed tank and a pH adjustment tank. Furthermore, in order to adjust the fed solution and the solution in the electrolytic cell to a desired pH, a pH sensor was disposed in the pH adjustment tank so that the pH would be automatically adjusted and a $Na_2CO_3$ solution would be automatically fed from a $Na_2CO_3$ storage tank to the pH adjustment tank. The electrowinning experiment was performed at varying current densities, temperatures and pHs.

1-3: Washing

Electrolytic manganese dioxide (EMD) resulting from Example 1-2 was washed with sulfuric acid. In this case, sulfuric acid used in the washing was used at a concentration of 1-3 M.

2: Results of Simultaneous Recovery of Co Metal and EMD 2-1: Recovery of Co Metal and EMD at Varying pHs Table 4 shows the current efficiencies and yields of Co metals at varying pHs. The experiment was performed for 12 hours while the current density and the temperature were maintained at 0.025 A/cm$^2$ and 60° C., respectively. As a result, it was determined that it was most preferable to maintain the pH in the electrolytic cell at 2 or more in order for a current efficiency of 90% or more to appear. At pHs below 2, current efficiencies of 69%, 77.2%, 80.8% and 88.3% appeared at pHs of 0.8, 1, 1.5 and 1.8, respectively. The reason for this is that the generation of hydrogen gas in the cathode was competitive with the reaction for production of Co metal, and thus the decrease in the pH in the electrolytic cell resulted in the decrease in the current efficiency. Therefore, it was determined that at a pH of 2 in the electrolytic cell, hydrogen ions in the solution can be reduced and the current efficiency can be maximized.

In the case of EMD, since the content of Mn in the solution was lower than the content of Co, all Mn was recovered as EMD, and the concentration of Mn in the solution after electrowinning was shown to be 1 mg/L or less.

TABLE 4

Results of experiment on current efficiencies of Co metal and EMD at varying pHs (12 hours, 0.025 A/cm$^2$, and 60° C.)

|  |  | pH |  |  |  |  |  |
|---|---|---|---|---|---|---|---|
|  |  | 0.8 | 1 | 1.5 | 1.8 | 2 | 3.5 |
| Co | Yield (g) | 16.931 | 18.943 | 19.827 | 21.667 | 23.016 | 22.760 |
|  | Current efficiency (%) | 69 | 77.2 | 80.8 | 88.3 | 93.8 | 92.9 |

2-2: Recovery Efficiencies of Co Metal and EMD at Varying Current Densities

Tables 5 and 6 show current efficiencies and Co purities at varying current densities and a fixed temperature and pH. The current efficiency was 90% or more at all the current densities, and the loss of Co electrodeposited on the anode was about 1.2 g. In addition, the purity of Co was 99.8% or more. Accordingly, it appeared that the electrowinning of Co had no connection with current density. However, it could be seen that the surface of the produced Co sheet was very smooth at a current density of up to 0.05 A/cm$^2$ when the produced Co sheet was examined but slight irregularities were formed on the produced Co sheet when a current density of 0.065 A/cm$^2$ was applied. This is a phenomenon that occurred because the applied current was localized to the cathode. Accordingly, a current density of 0.05 A/cm$^2$ could give the most satisfactory results.

TABLE 5

Results of experiment on Co metal and EMD at varying current densities (12 hours, 60° C., and pH 2)

|  | Current density |  |  |  |  |
|---|---|---|---|---|---|
|  | 0.025 A/cm$^2$ | 0.03 A/cm$^2$ | 0.04 A/cm$^2$ | 0.05 A/cm$^2$ | 0.065 A/cm$^2$ |
| Yield | 18.07 g | 21.5 g | 28.09 g | 34.30 g | 44.07 g |
| Current efficiency | 98.2 | 97.4 | 95.4 | 93.2 | 92.1 |
| Co loss | 1.212 g | 1.181 g | 1.231 g | 1.220 g | 1.231 g |

TABLE 6

Co purities at varying current densities in electrowinning (%)

| | Co | Mn | Ni | Li | Cu | Fe | Pb | Cd | Zn | Ca | Mg | Al |
|---|---|---|---|---|---|---|---|---|---|---|---|---|
| 0.025 A/cm² | 99.93 | 0.005 | — | — | — | 0.031 | 0.026 | — | — | — | — | — |
| 0.03 A/cm² | 99.96 | 0.004 | 0.001 | — | — | 0.001 | 0.03 | — | — | — | — | — |
| 0.04 A/cm² | 99.95 | 0.007 | — | — | — | 0.0026 | 0.031 | — | — | — | — | — |
| 0.05 A/cm² | 99.92 | 0.008 | 0.018 | — | — | 0.0045 | 0.043 | — | — | — | — | — |
| 0.065 A/cm² | 99.86 | 0.07 | 0.012 | — | 0.001 | 0.0038 | 0.053 | — | — | — | — | — |

2-3: Recovery Efficiencies of Co Metal and EMD at Varying Temperatures

Tables 7 and 8 show experimental results at varying temperatures at a fixed current density of 0.05 A/cm² and a fixed pH of 2 in the electrolytic cell. In the experiment performed at a temperature ranging from 30° C. to 60° C., Co metal was sufficiently electrodeposited on the cathode, and thus all the produced Co metal showed a purity of 99.9% or more.

TABLE 7

Electrowinning experiment at varying temperatures

| Temperature (° C.) | 30 | 40 | 50 | 60 |
|---|---|---|---|---|
| Yield (g) | 2.898 | 10.73 | 35.15 | 35.04 |
| Current efficiency (%) | 94.5 | 94.8 | 95.5 | 95.2 |
| Co loss (g) | — | 0.2 | 1.271 | 1.230 |

TABLE 8

Co purities at varying temperatures in electrowinning (%)

| Temperature (° C.) | Co | Mn | Ni | Li | Cu | Fe | Pb | Cd | Zn | Ca | Mg | Al |
|---|---|---|---|---|---|---|---|---|---|---|---|---|
| 30 | 99.99 | 0.003 | — | — | — | — | — | — | — | — | — | — |
| 40 | 99.95 | 0.002 | 0.014 | — | — | 0.0036 | 0.024 | — | — | — | — | — |
| 50 | 99.93 | 0.007 | 0.012 | — | — | 0.0088 | 0.043 | — | — | — | — | — |
| 60 | 99.94 | 0.004 | 0.018 | — | — | — | 0.037 | — | — | — | — | — |

2-4: Results of Washing of Recovered EMD

In all the experiments, the concentration of Mn in the solution was significantly lower than that of Co, and thus Mn in all the experiments was could be recovered as EMD after 12 hours. Accordingly, the current efficiency for Mn could not be determined. EMDs obtained in the experiments were mixed, and the components of the EMD mixture were analyzed. As a result, the EMD mixture showed an EMD purity of 95.24%, and contained 3.3% Co as the largest impurity and 1.21% Pb. To wash out such impurities, an EMD washing experiment was performed using varying concentrations of sulfuric acid. The results of the experiment are shown in Table 9. It can be seen that Co could be removed in small amounts as the concentration of sulfuric acid increased, but Pb was scarcely removed. However, the purity of the recovered EMD increased to 97% or more after washing.

TABLE 9

Purity of Recovered EMD (%)

| | EMD | Co | Ni | Li | Cu | Fe | Pb | Cd | Zn | Ca | Mg | Al |
|---|---|---|---|---|---|---|---|---|---|---|---|---|
| Anode (%) | 95.24 | 3.3 | — | — | — | 0.25 | 1.21 | — | — | — | — | — |
| 1M sulfuric acid | 97.16 | 1.7 | — | — | — | — | 1.14 | — | — | — | — | — |
| 2M sulfuric acid | 97.22 | 1.6 | — | — | — | — | 1.18 | — | — | — | — | — |
| 3M sulfuric acid | 97.64 | 1.2 | — | — | — | — | 1.16 | — | — | — | — | — |

3. Conclusion

Co metal and EMD could be simultaneously recovered from a single energy source without separating Co and Mn.

Furthermore, to increase the recovery rate of CO and current efficiency, studies regarding varying pHs in the electrolytic cell, varying temperatures and current densities were conducted. As a result, it was necessary to maintain the pH in the electrolytic cell at 2 or more in order to increase the current density, in which case a current efficiency of about 93% or more appeared. In order to increase the generation rate of Co metal, it was most preferable to apply a current density of 0.05 A/cm².

In all the cases, the purity of Co was 99% or higher, and Mn in the solution could be recovered as EMD after 12 hours.

The purity of the recovered EMD was 95.24%, but a small amount of the impurity Co was washed out in the experiment of washing with sulfuric acid, and thus the purity of EMD slightly increased to 97% or higher. Pb was rarely removed.

The invention claimed is:

1. A method of simultaneously recovering cobalt and manganese from a lithium-based battery, the method comprising:

(1) heat-treating the lithium-based battery;
(2) grinding the heat-treated battery to obtain ground particles, and separating particles having a particle size of 12 mesh or less from the ground particles;
(3) subjecting the separated particles to multistage leaching;
(4) adding 2-ethylhexyl phosphonic acid mono-2-ethylhexyl ester (PC88A) to a product of the multistage leaching to obtain an electrowinning solution;
(5) subjecting the electrowinning solution to electrowinning using circulation-type electrodes, the electrodes including a cathode made of stainless steel and an anode made of a 93% Pb-7% Sn alloy, wherein the electrowinning is performed in an electrolytic cell at a pH of 2 or more, a current density of 0.025-0.065 A/cm2 and temperature of 30-60° C.; and
(6) washing and simultaneously recovering cobalt metal and electrolytic manganese dioxide (EMD).

2. The method of claim 1, wherein the lithium-based battery comprises a lithium-ion battery and a lithium primary battery.

3. The method of claim 1, wherein a concentration of cobalt ions in the electrowinning is 15-20 g/L or higher.

4. The method of claim 1, wherein the washing is performed using sulfuric acid.

* * * * *